United States Patent [19]

Naydan et al.

[11] 4,103,215
[45] Jul. 25, 1978

[54] TORQUE REPEATER SELF-DRIVER

[75] Inventors: Bob Nicholas Naydan, Wyckoff; Arnold Joseph Brand, Parsippany, both of N.J.

[73] Assignee: The Singer Company, Little Falls, N.J.

[21] Appl. No.: 743,733

[22] Filed: Nov. 22, 1976

[51] Int. Cl.² .............................................. G05B 1/06
[52] U.S. Cl. .................................. 318/654; 318/660; 318/661
[58] Field of Search ............... 318/654, 655, 658, 659, 318/660, 661

[56] References Cited

U.S. PATENT DOCUMENTS

| 3,353,095 | 11/1967 | Farrand | 318/661 X |
| 3,419,774 | 12/1968 | Hartley | 318/661 |
| 3,555,542 | 1/1971 | Guiot | 318/661 X |
| 3,562,740 | 2/1971 | Watkins | 318/661 X |

Primary Examiner—B. Dobeck
Attorney, Agent, or Firm—L. A. Wright; T. W. Kennedy

[57] ABSTRACT

A device employing the inherent self-torquing properties of a torque repeater to position its rotor. In the present invention, the torque repeater or synchro may have three stator windings and an output rotor. It is contemplated that the electrical input to the device will be digital signals. However, the invention will perform equally well with time varying or analogue input signals. A plurality of electronic switching means are connected to the stator terminals of the synchro converter and they operate under the control of a programmable switch control to short-circuit predetermined stator windings to provide the desired positional output signals. A sectant detector connected to the stator windings detects signals on the stator windings and determines the present position of the rotor. From this information, the desired positioning of the rotor is attained from the signals from the sectant detector. A duty cycle drive means acting in concert with the sectant detector positions the torque repeater between sectant positions. An alternative to the sectant detector is the provision of an A/D converter used to drive the switching means to allow the torque repeater to self-drive to the desired output position.

5 Claims, 5 Drawing Figures

TORQUE REPEATER SELF DRIVER
BLOCK DIAGRAM

TORQUE REPEATER SELF DRIVER BLOCK DIAGRAM

ROTOR POSITIONS FOR SWITCH CLOSURES

NOTE:
CLOSURE OF SW#1 PRODUCES 120° OR 300°
SW#2 " 0° OR 180°
SW#3 " 60° OR 240°

VOLTAGE SECTOR RELATIONSHIPS

TORQUE REPEATER SELF-DRIVER

This invention is related to torque repeaters. More importantly, this invention is related to a technique to position the rotor of a torque repeater by employment of its self-torquing properties.

BACKGROUND OF THE INVENTION

Torque type synchros are generally characterized as transmitters (TX), differentials (TDX) or receivers (TR). A frequent use for torque repeater or receivers is for driving dial and pointers directly without further amplification. Where there is a need for a small, highly efficient technique of torque repeater positioning from a digital source, the prior art taught only a torque repeater employing bulky servos or sophisticated high-power electronic circuitry to achieve the desired result.

The technique of the present invention utilizes the self-drive capability of the torquer repeater to position the unit to the desired angle. Thus, the disadvantages of large size and power as well as high cost are overcome.

BRIEF DESCRIPTION OF THE INVENTION

The present invention comprises a torque repeater or synchro which may have three stator windings and an output rotor. Depending upon the input to the stator windings the rotor will come to rest at a positional null which indicates the mechanical position of the electrical input. It is contemplated that the electrical input will be digital signals. However, the invention will perform equally well with time varying inputs or analogue signals. A plurality of electronic switching means are connected to the stator terminals and they operate under the control of a programmable switch control to short circuit predetermined stator windings to provide the desired positional output signals. A sectant detector connected to the stator windings detects signals on the stator windings and determines the desired positioning of the output windings. A duty cycle drive means acting in concert with the sectant detector positions the torque repeater between sectant positions.

Accordingly, it is an object of this invention to provide a torque repeater which uses the inherent self-drive capability of the torque repeater to position the unit to the desired output angle.

This and other objects, features and advantages of the present invention will become apparent from the following description taken in conjunction with the accompanying drawings wherein.

Figure 1:
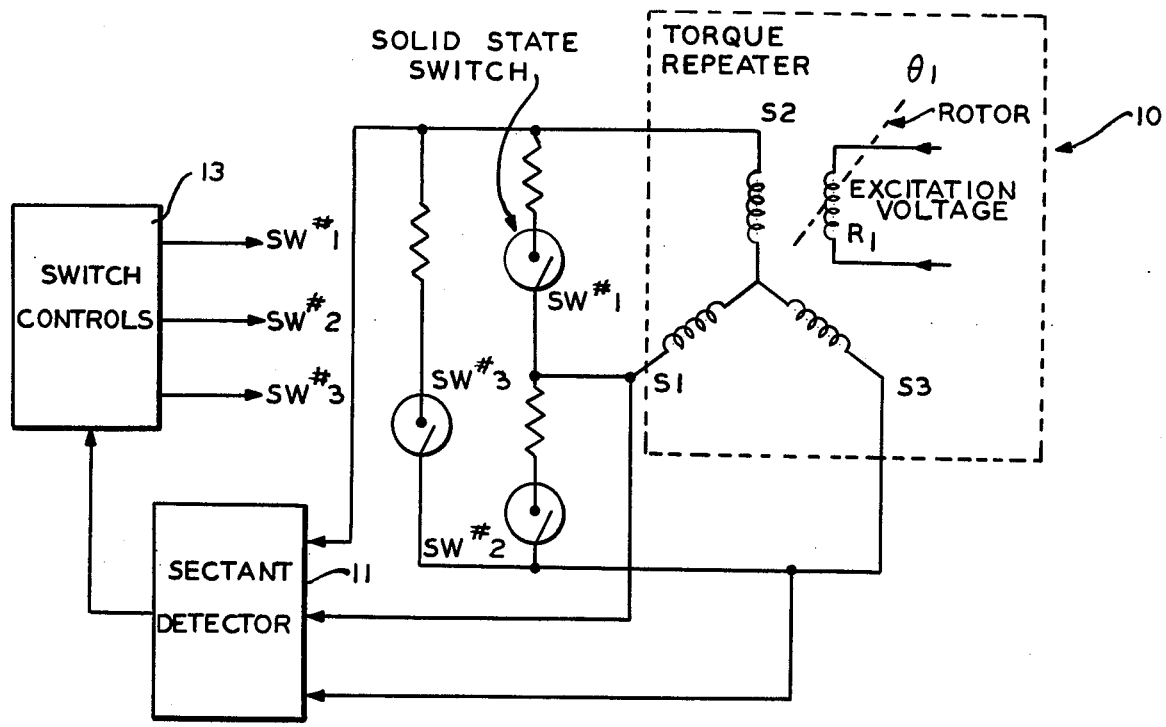
FIG. 1 is a block diagram of the self-driving torque repeater of the invention.

Referring to FIG. 1, a block diagram of the torque repeater of the invention is shown. The torque repeater 10 comprises stator windings $S_1$, $S_2$, $S_3$ and rotor $R_1$. The rotor winding is connected to a source of excitation voltage and under the influence of a signal voltage on the stator windings rotates through an angle $\theta$. Connected to the input terminals of stator windings $S_1$, $S_2$, and $S_3$ are three solid state switches $Sw_1$, $Sw_2$ and $Sw_3$.

The solid state switches are shown in FIG. 1 as mechanical switching elements only for the sake of simplicity. In the actual device, active electronic devices are employed and these devices are well-known to those skilled in the art. $Sw_1$ is connected across stator windings $S_1$ and $S_2$, $Sw_2$ is connected across stator windings $S_2$ and $S_3$, $Sw_3$ is connected across stator windings $S_2$ and $S_3$. Sectant detector 11 is connected across stator windings $S_1$, $S_2$, $S_3$ and switches $Sw_1$, $Sw_2$, $Sw_3$. The function of sectant detector 11 is to sense the present position of torque repeater 10 and use this information to force the torque repeater to null at the desired position. The sectant detector is also connected to switch control 13 which has the function of providing the digital input signals, representative of mechanical position output, to switches $Sw_1$, $Sw_2$ and $Sw_3$.

In operation, when nominal short-circuit is applied across any of two stator terminals (e.g. $S_1S_2$, $S_1S_3$ or $S_2S_3$) the rotor, $R_1$ of torque repeater 10 will position itself for minimal current null through the short-circuit. Away from null, a current will flow through the short-circuit producing a self-torque to drive the rotor to the null position. For example, with $Sw_2$ closed and $Sw_1$ and $Sw_3$ open, the rotor will position itself, to induce a minimum voltage between stator windings $S_1$ and $S_3$. Two positions exist to satisfy this condition. The voltage induced by the rotor winding produces an output between stator windings $S_1$ and $S_3$ proportional to:

$$V_{S_1S_3} = E\, k\, \sin\theta_1,$$

where
 $E$ is the rotor excitation voltage
 $k$ is the transformation ratio between the rotor and secondary windings
 $\theta_1$ is the angular position of the rotor
 $V_{S_1S_3}$ equals 0 for $\theta_1$, = 0° or 180°.

Individual shorting of $Sw_1$ and $Sw_3$ will drive the rotor to other null conditions.

Figure 2:
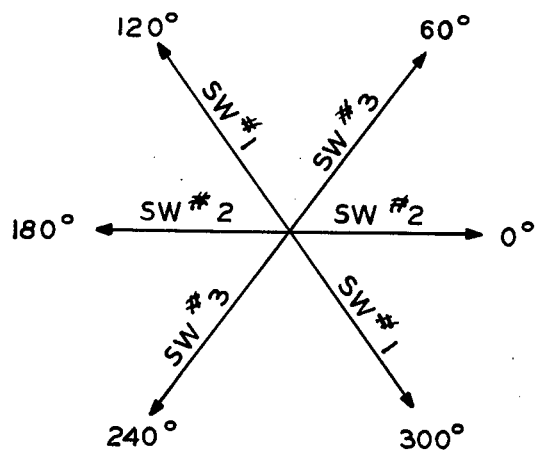
FIG. 2 is a graphical representation of the positional output of the rotor with certain switch closures.

FIG. 2 illustrates the rotor positions for switch closures. Closing of switches $Sw_1$, $Sw_2$ or $Sw_3$ can drive the torque repeater to any one of six possible positions. Should it be required to only position the rotor to angles of 60° increments nothing more is required than three switches and controls. Since the closing of any one of the three switches will position the rotor to one of two possible positions for that individual switch, additional circuitry is required to determine that the desired position of the two is attained.

Figure 3:
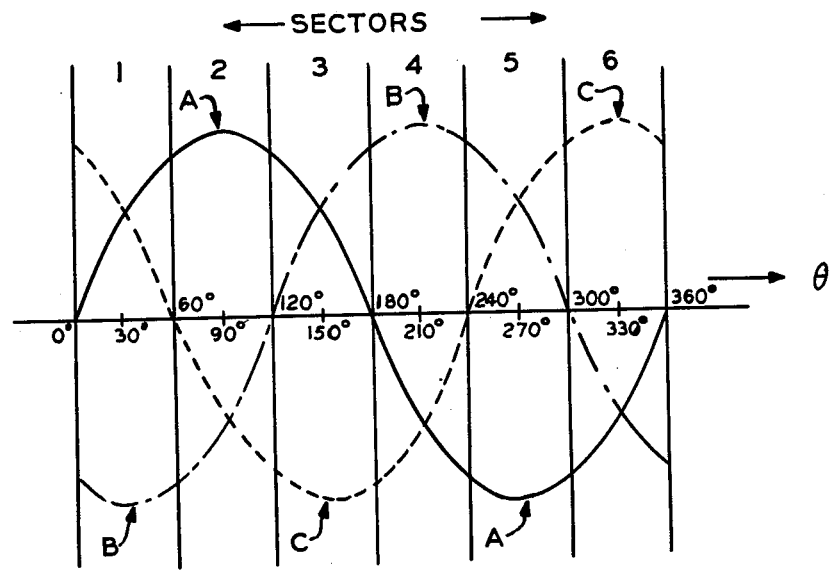
FIG. 3 is a graphical representation of voltage-sector relationship.

The circuit provided for achieving the desired position of any individual switch is provided in sectant detector 11 shown in FIG. 1. The sectant detector comprises a group of three comparators (not shown) each of which samples the three torque repeator stator winding voltage polarity. The voltage polarities of the stator windings are shown in FIG. 3. With the polarities as shown on each of the stator windings the sectors 1 through 6 will be determined. For example, assume that it is required to position the torque repeater to the 0° position. Switch $Sw_2$ would be closed and the sectant detector comparators sampled. If the comparator monitoring waveform B (Comparator B) reads negative and the comparator monitoring waveform C (Comparator C) reads positive then the rotor is properly positioned at 0°. If however, comparator B should indicate positive instead of negative and comparator C indicate negative instead of positive, then the rotor has been incorrectly positioned to 180° instead of 0°. In this event, the following procedure would be taken. Switch Sw₁ would be closed which would position the rotor from 180° to 120°. (See FIG. 2). Note that when Sw₁ is closed, the torque repeater will position to 120° and not 300° as the rotor will move to its nearest null position. Since 120° is closer to 180°, ($\Delta = 60°$), than 300° is to 180° ($\Delta = 120°$), the rotor will position itself to 120°. Subsequently, Sw₃ would be closed and the torque repeater will position itself to 60°. Finally, Sw₂ would be closed positioning the torque repeater to the desired angle, namely 0°.

Figure 4:
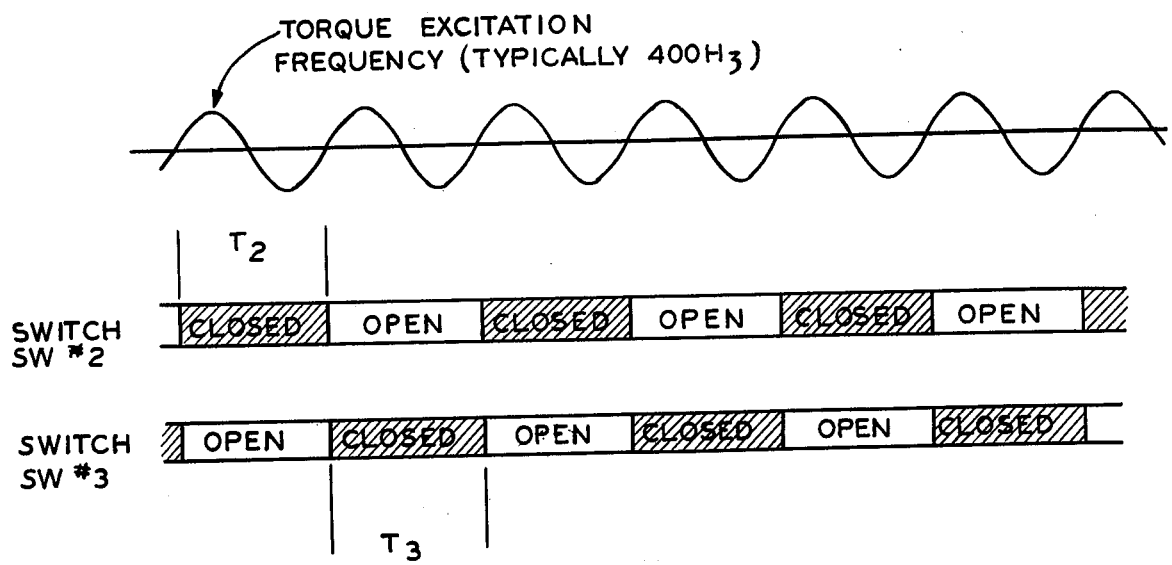
FIG. 4 is a graphical representation of a duty cycle voltage applied to the stator switches.

For most requirements positioning to 60° increments is not adequate and additional resolution is necessary. This is accomplished as follows. To position the torquer within 60° increments, an appropriate duty cycle is applied to the shorting switches. For example, to position the rotor to 30° (assuming the rotor has been positioned to the correct sector), Sw₂ and Sw₃ are closed alternately, each at a 50% duty cycle which would result in the torquer assuming the 30° position. A typical 50% duty cycle is illustrated in FIG. 4.

$T_2 = T_3$

Thus $T_2/T_3 = 1$ or

Duty cycle $T_2 = T_2/(T_2+T_3) \times 100\% = 50\% = T_3$

A typical application for the duty cycle technique is the positioning whose output is geared to a display wheel with the digits 0 through 9 equally spaced on the wheel. Table I illustrates the approximate duty cycles required to position to each number.

TABLE 1

| | SWITCH DUTY CYCLE FOR 0→9 DISPLAY | | | | |
|---|---|---|---|---|---|
| Logic Input Code | Numeric | Equivalent Rotor Angle | SW#1 | SW#2 | SW#3 |
| 0000 | 0 | 0° | 0% | 100% | 0% |
| 0001 | 1 | 36° | 0% | 40% | 60% |
| 0010 | 2 | 72° | 20% | 0% | 80% |
| 0011 | 3 | 108° | 80% | 0% | 20% |
| 0100 | 4 | 144° | 60% | 40% | 0% |
| 0101 | 5 | 180° | 0% | 100% | 0% |
| 0110 | 6 | 216° | 0% | 40% | 60% |
| 0111 | 7 | 252° | 20% | 0% | 80% |
| 1000 | 8 | 288° | 80% | 0% | 20% |
| 1001 | 9 | 324° | 60% | 40% | 0% |

It should be noted that the requirements for positions 0 through 4 are identical to positions 5 through 9 simplifying control circuitry.

Thus, upon receipt of a digital command a code representing the desired rotor angle, the appropriate switches are closed with the proper duty cycle to provide the desired result.

The total circuitry required for this device can be implemented with straight-forward logic techniques utilizing gates, counters, PROMS/ROMS, etc., all well-known to those skilled in the art.

Figure 5:
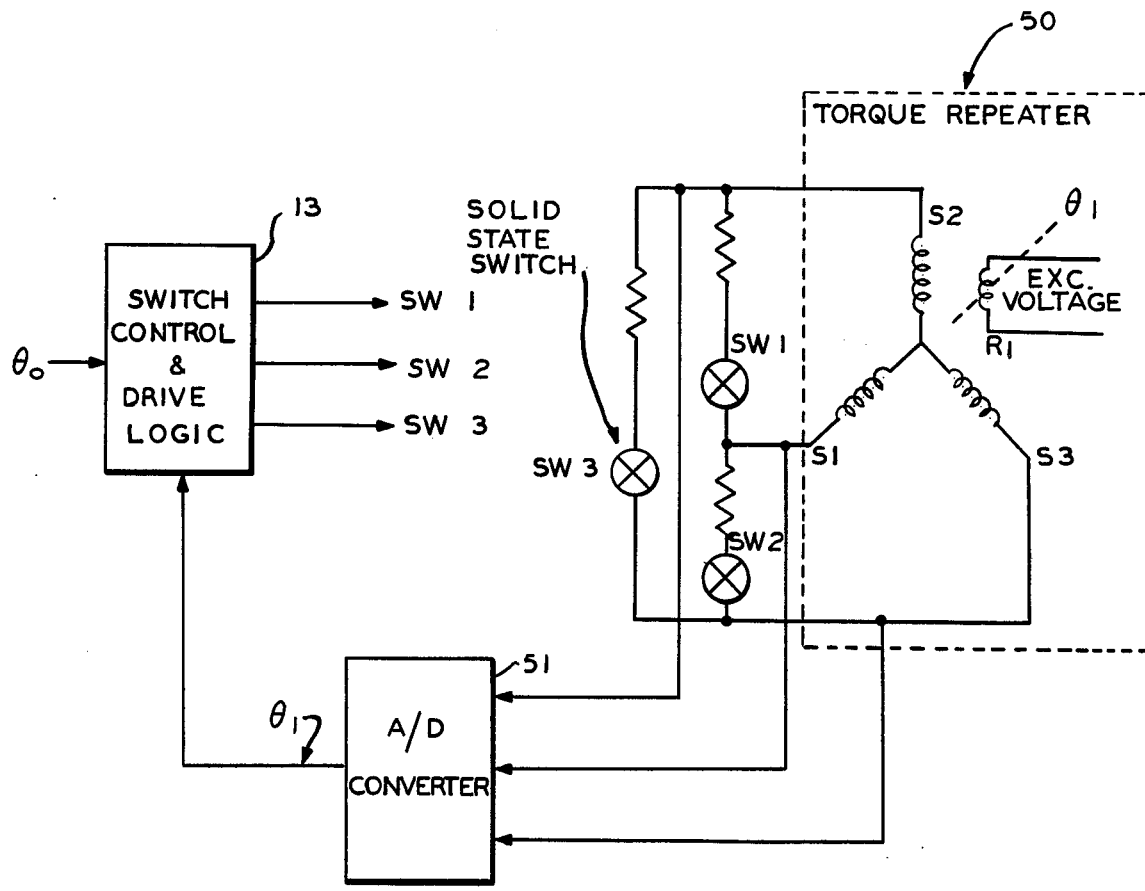
FIG. 5 is a block diagram similar to FIG. 1 employing an A/D converter to drive the switching means.

An alternate method of positioning the torque repeater is shown in FIG. 5. That system operates as follows: torque repeater angle $\theta_1$ from torque repeater 50 is fed to an A/D converter 51. The resultant digital outputs $\theta_1$ from A/D converter 51 in conjunction with $\theta_0$ the desired angular output, is used to drive switches Sw₁ or Sw₂ or Sw₃ to momentary or timed shorting periods allowing torque repeater 50 to self-drive to the desired angle $\theta_0$ until the feedback loop is satisfied whereupon $\theta_1 = \theta_0$.

From the foregoing, a self-driving torque repeater has been described. Although only preferred embodiments of the present invention have been described herein, it is not intended that the invention be restricted thereto, but that it be limited only by the true spirit and scope of the appended claims.

What is claimed is:

1. A torque repeater system comprising:
   a synchro converter having three stator windings,
   said synchro having inherent rotor sectant positions of 60° when discrete stator windings are short-circuited,
   switching means comprising three electronic switching circuits connected across said stator windings,
   a programmable switch control connected to said switching means, and
   a sectant detector connected to said switching means said stator windings and said programmable switch control said detector sensing the sectant of the angle of rotation of said synchro converter.

2. The torque repeater system of claim 1 comprising:
   means for applying a time varying signal to said switching means whereby the rotor of said synchro is positioned between said inherent sectant positions.

3. A torque repeater system comprising:
   a synchro converter having a plurality of stator windings and a rotor said rotor inherently rotating to a null position when certain stator windings are short-circuited, each of said null positions representing a sectant of rotation,
   a plurality of switching means connected to said stator windings,
   a programmable switch control connected to said plurality of switching means for applying signals to said switching means in a predetermined sequence, and
   a sectant detector comprising a plurality of comparator means for sensing the sectant of the angle of rotation of said rotor which corresponds to the shorting of said stator windings said sectant detector applying a signal to said programmable means for rotating said synchro to the desired positional output.

4. A torque repeater system comprising:
   a synchro converter having a plurality of stator windings said synchro having rotation of its rotor through the application of signals on said stator windings,
   a plurality of switching means connected across said stator windings,
   a programmable switch control connected to said plurality of switching means for applying signals to said switching means in a predetermined sequence, and
   an analog-to-digital converter connected between said stator windings and said programmable switch control for converting the signals from said stator windings into digital inputs signals to said programmable switch control.

5. The torque repeater system of claim 3 comprising:
   a source of digital input signals to said programmable switch control said digital signals representing the desired rotational angle of said rotor.

* * * * *